Sept. 22, 1970     C. A. EFF     3,529,973
METHOD OF BROILING IN AN OVEN
Original Filed April 18, 1966     2 Sheets-Sheet 2

INVENTOR.
CHRISTIAN A. EFF
BY *Richard L. Cashin*
HIS ATTORNEY

United States Patent Office 3,529,973
Patented Sept. 22, 1970

---

3,529,973
METHOD OF BROILING IN AN OVEN
Christian A. Eff, Louisville, Ky., assignor to General
Electric Company, a corporation of New York
Original application Apr. 18, 1966, Ser. No. 543,210, now
Patent No. 3,367,316, dated Feb. 6, 1968. Divided
and this application Aug. 31, 1967, Ser. No. 664,843
Int. Cl. A23l 1/00
U.S. Cl. 99—107                                          2 Claims

ABSTRACT OF THE DISCLOSURE

A closed door broiling oven having an oven cavity with a radiant heat broiling means in the top thereof, and means for sealing the oven door during a broiling operation. The oven also has an exhaust vent with an oxidation unit combined therewith. There is a restricted air opening into the oven for admitting oxygen required by the oxidation unit. A temperature control means is provided for the oven, and it includes a temperature sensor adjacent one wall of the oven housing. External, forced air cooling means are provided for extracting heat from the walls forming the cooking cavity and also reducing the temperature of the sensor so that the oven temperature control means is prevented from cycling at a preset broiling temperature so that the oven heating means is energized continuously. The oven is also provided with a layer of thermal insulation surrounding the cooking means, as well as an external oven housing or body structure.

---

This application is a division of my copending application Ser. No. 543,210, filed Apr. 18, 1966 entitled, "Oven For Closed Door Broiling," now Pat. No. 3,367,-316 issued Feb. 6, 1968.

BACKGROUND OF THE INVENTION

The majority of domestic broiling ovens used heretofore employ a top radiant heating means, and the meat is supported in a broil pan that is placed on a rack that is spaced from the radiant heating means by a distance which is a function of the rareness or amount of doneness of the meat when cooked. For WELL DONE, the meat should be positioned away from the heater and cooked a relatively long time. For RARE, the meat would be placed near the heater and cooked a relatively short time and for MEDIUM the meat would be located somewhere between the two extreme positions. The oven door is adapted to be propped open in a broil position, which is in a semi-closed position leaving a top gap of perhaps 3 or 4 inches measured from the top edge of the oven door to the oven body. The door is left partially open during broiling in order to permit enough ambient air to circulate through the oven for the purpose of keeping both the oven air and the oven temperature sensor cool and thereby permit the radiant heating means to be energized continuously and avoid having the power to the heating means cycling ON and OFF.

The principal objection to open door broiling in the minds of some people is that this large flow of ambient air tends to cause the meat to be excessively dry. Moreover, it is difficult and expensive to filter the discharge air from the oven of its smoke, grease, doors and vapors. The discharge air could be vented directly to the outside of the kitchen; but this is not always practical, especially in older homes.

OBJECTS OF THE INVENTION

The principal object of the present invention is to provide a method of broiling foods within a closed oven wherein the method essentially involves the step of cooling the walls of the oven liner by an external means so that the oven heating means are energized substantially constantly.

A further object of the present invention is to provide a method of broiling foods within a closed oven wherein the food soil and grease spatter created during broiling does not become baked onto the walls forming the oven cavity, and thereby making it possible to remove the oven soil with a moist sponge.

A further object of the present invention is to provide a method of broiling meat within a closed door oven wherein the meat is not excessively dried, and further including the step of degrading all smoke, odors, grease and vapors which are generated during the broiling operation so that relatively clean air can be returned to the kitchen atmosphere.

SUMMARY OF THE INVENTION

The present invention, in accordance with one form thereof, relates to a method of broiling food with a closed oven cavity by first providing a source of radiant heat in the cavity, then cooling the walls forming the oven cavity by an external means, creating a gentle flow of air through the oven cavity and exhausting from the cavity any gaseous products which are generated during the broiling operation, while oxidizing the exhaust gases so as to eliminate the smoke, odors and vapors being returned to the atmosphere.

BRIEF DESCRIPTION OF THE DRAWING

My invention will be better understood from the following description taken in conjunction with the accompanying drawings and its scope will be pointed out in the appended claims.

Figure 1:
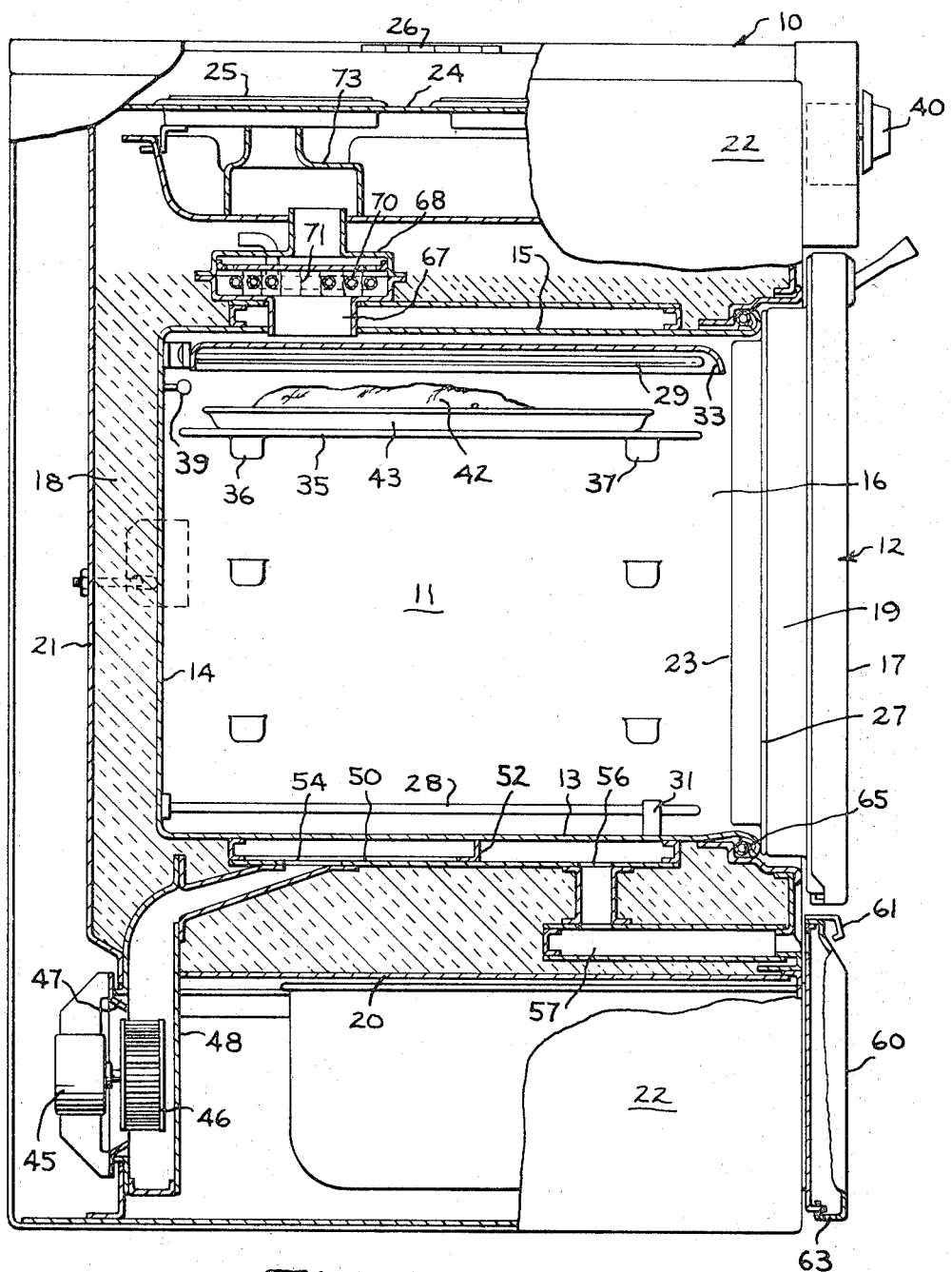
FIG. 1 is a left-side elevational view of an electric range having a broiling oven employing the broiling method of the present invention with some parts broken away and others in cross-section to show the principal elements which are used for closed door broiling.

Turning now to a consideration of the drawings and in particular to FIG. 1, there is shown an electric range 10 having as its principal component a box-like oven liner 11 in combination with a front-opening access door 12 which together form an oven cooking cavity. The oven liner 22 is of sheet metal construction having a bottom wall 13, back wall 14, top wall 15 and opposite side walls 16, 16. The front of the oven liner is open and it is adapted to be closed by the oven door 12, as is clearly illustrated.

As is standard oven designs, a layer of thermal insulating material 18 surrounds the oven liner on all five sides and serves to retain the heat present in the oven cavity so as to render the system thermally efficient. A sheet metal insulation guard 20 is present beneath the oven for supporting the insulation and similar vertical panels 21, as seen at the back of the oven, support the insulation at the back and the two sides. The oven is further provided with an outer casing or oven body 22 of decorative finish, such as porcelain enamel, to enclose the entire assembly.

This invention is shown being practiced in a complete electric range having a top cooking surface or cooktop 24 assembled over the oven and including a plurality of surface heating units 25 formed of metal sheathed resistance heating elements, as is conventional in this art. Each surface heating unit 25 is provided with a multiple pushbutton selector switch 26 along one side edge of the cook-top 24 for controlling the degree of heating energy available.

Figure 3:
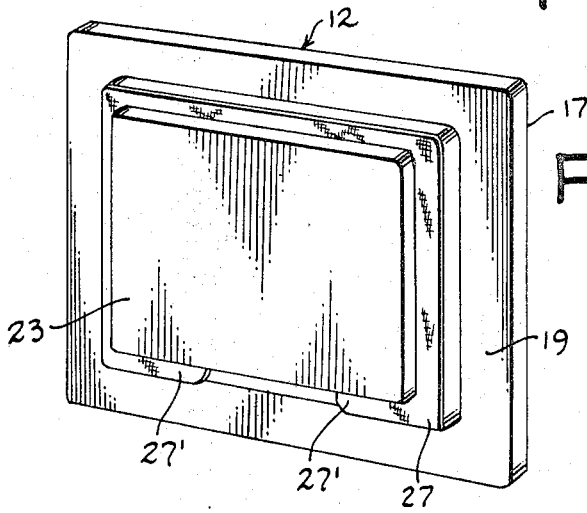
FIG. 3 is a perspective view of the inside surface of the oven door of FIG. 1 to show a restricted air inlet means for the oven cavity adjacent the bottom edge of the door.

The design of the oven door is best illustrated in the patent to Clarence Getman No. 3,189,020 entitled "Oven Door With Floating Inner Panel," as well as in present FIG. 3. There is an outer door panel 17, an inner door liner 19 and a floating inner panel 23. Moreover, there is a woven strip or belt 27 of thermal gasket material sandwiched between the inner door liner and the floating inner panel. The two ends 27', 27' of the gasket 27 are spaced apart from each other t o create a restricted opening therebetween for the purpose of permitting a measured amount of room air to be drawn into the oven cavity.

The oven cavity is provided with two heating elements; namely, a lower baking element 28 and an upper broiling element 29, which are each in the form of a metal sheathed resistance heating element that is bent into a large loop and is provided with two terminal ends which extend through the back wall 14 of the oven liner for making electrical connections therewith. The baking element 28 is provided with a plurality of supporting clips or feet 31 for holding the baking element spaced off of the bottom wall 13 so as not to develop hot spots which might damage the porcelain enamel finish that covers the interior surface of the oven liner. The upper broiling element 29 is provided with a pan-shaped reflector 33 which overlies the broiling element and serves to direct the radiant energy downwardly into the oven cavity as well as to shield the upper wall 15 of the oven liner from the intense heat.

As in standard baking and broiling ovens, the oven cavity is provided with one or more oven racks 35 of welded wire construction which are adapted to be supported on rack-supporting embossments or shelves 36 and 37 which are formed on the opposite side walls 16 of the oven liner. The oven door 12 is also made of sheet metal panels that are fastened together, and its interior is substantially full of a thermal insulating material (not shown) such as fiber glass or the like so that the oven heat is retained within the cooking cavity for obtaining uniform cooking results no matter where the food might be placed within the oven.

A standard oven thermostatic control comprises a temperature sensor such as the fluid-filled bulb or probe 39 that is supported from the back wall 14 of the oven liner adjacent the top thereof, and a thermostatic switch or responder illustrated diagrammatically in FIG. 1 as element 40, that is arranged in the front edge of the cooktop 24. The connection between the bulb 39 and the thermostat 40 would be by way of a capillary tube (not shown) so that the temperature sensed within the oven cavity is detected by the responder and a reaction takes place according to the manual temperature setting of the thermostat.

Normal cooking temperatures range from about 150° F. to about 550° F. The baking temperatures vary between about 150 F. and 400° F., while the broil position of the thermostat is a single, fixed, high temperature position preferably where the broiling element 29 would be energized continuously during the broiling operation.

As mentioned previously, the majority of broiling ovens have used an open door technique, where the oven door 12 would be propped in a partially open position. The oven thermostat 40 would be set to the broil position for energizing the heating element 29 continuously at its rated wattage of about 3,000 watts. For broiling meat RARE, the over rack 35 would be raised to its highest position as shown in FIG. 1 and the meat 42 to be cooked would be placed in a special broil pan 43, which is usually provided with a perforated insert (not shown) that supports the meat off the bottom wall of the pan 43. For broiling meat WELL DONE, the oven rack would be lowered away from the broil element, so that the meat could be cooked for a lower time without scorching the outside of the meat. The perforations allow the grease to flow into the bottom of the pan and the grease would be shielded from the radiant heat of the broil element 29 so as to reduce the amount of smoke, odors, and vapors that are generated during the broiling operation.

The present invention departs from the past practice by adopting a closed door broiling system wherein the oven cooking cavity is kept substantially closed, during the broiling operation. In the past, the oven door 12 was left open mainly to allow for a large circulation of ambient air to cool the oven air as well as cool the temperature sensor 39.

Figure 2:
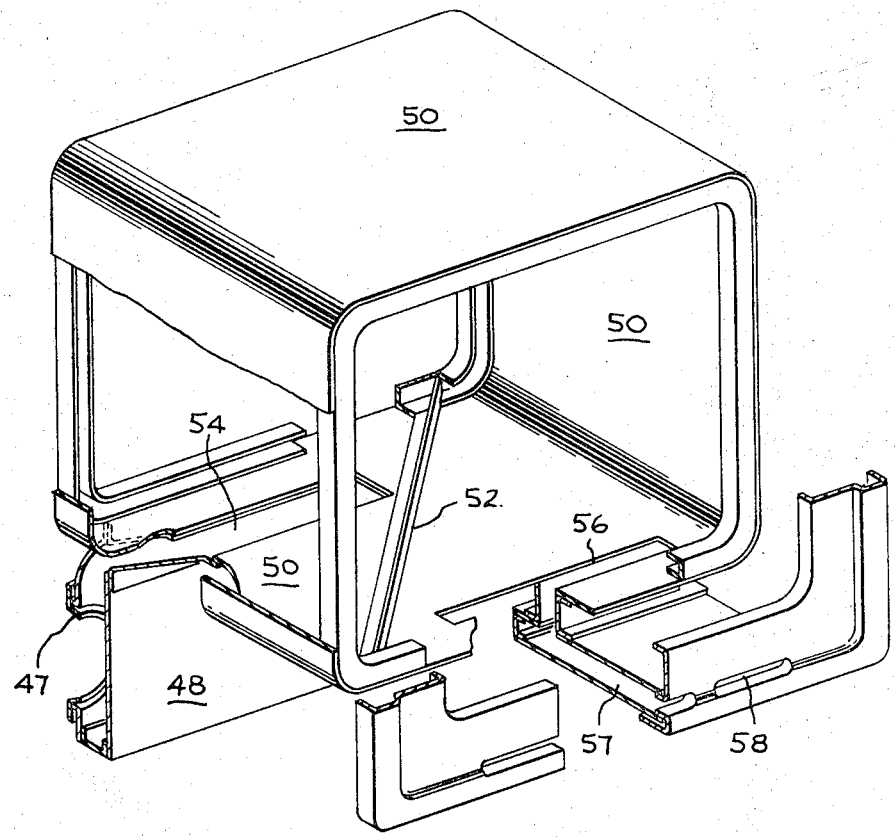
FIG. 2 is a fragmentary perspective view of the walls which are spaced outwardly from the oven liner (not shown) to form air cooling channels or passages for circulating air around the oven liner so that the oven liner serves as a heat exchanger and is kept relatively cool during the closed door broiling operation.

In the present invention, when the oven door 12 is kept closed some means must be provided for cooling the oven air and the oven temperature sensor 39. These tasks are performed by an external cooling medium which in effect washes the metal walls of the oven liner 11 so that the oven liner serves as a heat exchanger and its walls remain at a temperature between about 300° F. and 500° F. during the broiling operation, while the average maximum temperature of the food is held between about 120° F. and about 190° F. Looking at FIG. 1 there is shown a motor 45 and blower wheel 46 which is located in the range beneath the oven for drawing ambient air through an air intake opening 47 at the back of the range. Assembled around the blower wheel 46 is an air duct 48 which conveys the forced air toward the oven liner 11. Surrounding the bottom wall 13, side walls 16, 16 and the top wall 15 is a sheet metal housing 50 which is closely spaced from the related walls of the oven liner by about one or two inches. In other words, the oven liner 11 fits telescopically into a larger sheet metal housing or liner 50, as can best be visualized from FIG. 2 wherein the oven liner 11 has been removed. It should be recognized that while the illustrated design merely shows air passages surrounding only the four walls of the oven liner and not the back wall 14, an alternative having air passages surrounding all of the walls of the oven liner is within the intended scope of the present invention. Another modification would be to employ narrow air ducts or air tubes around the oven liner as a heat exchange method in place of the complete air channels as are shown.

A diagonal partition or angle iron 52 is positioned in the air channel beneath the bottom walls 13 of the oven liner 11 and extends from one back corner to the diagonally opposite front corner to form a partition or air diverter. The air duct 48 leads toward the bottom wall of the enclosure 50 for the oven liner and there is a large rectangular opening 54 to permit the air from the duct 48 to enter the air passages. Because of the presence of the partition or air diverter 52, the air is allowed to sweep over only one half of the bottom wall 13 of the oven liner and then it rises up one side of the oven liner thereby cooling the side wall thereof, and then it passes over the top wall 15 of the oven liner and then down over the opposite side wall 16 of the oven liner, and finally under the remaining half of the bottom wall 13 of the oven liner until it reaches a rectangular-shaped outlet 56 from which the air is carried through an air duct 57 toward the front of the range body where it escapes through a plurality of horizontally disposed elongated slots 58. Turning back to FIG. 1, the air outlet 56 is shown in the bottom wall of the panel 50 toward the front of the oven liner and the air duct 57 extends forwardly to an area beneath the bottom edge of the oven door 12.

In a standard range, a storage drawer is usually provided beneath the oven and this is shown in FIG. 1 by way of the front door panel 60. This drawer would serve mainly for storing pots and pans and other cooking utensils. The front drawer panel is provided with a drawer pull or handle 61 for ease in grasping the drawer and moving it between its open and closed positions. Rather than having the air from the cooling system discharging directly into the kitchen it was deemed preferable to have the drawer panel 60 serve as a diverter that overlies the exhaust slots 58 of the exhaust duct 57 and hence spread out the air flow pattern by carrying the air through the interior of the drawer panel so that it may exhaust out through the slots 63 in the lower edge of the front drawer panel 60.

An unobvious result was discovered during the construction and testing of the present invention having an oven liner with relatively cool walls during broiling; namely, the fact that the food soil and grease spatter does not bake onto the walls of the oven liner and hence the soil and grease does not discolor or decompose as readily due to the heat; and less smoke, odors and vapors are generated.

One important modification would be to combine this invention of a closed door broiling oven having cool walls with a self-cleaning oven design using the principle of pyrolysis as is disclosed and claimed in the patent of Bohdan Hurko No. 3,121,158 which is also assigned to the General Electric Company, the assignee of the present invention. Since the oven soil does not bake on as readily as in standard ovens, the pyrolytic process of the Hurko patent would perform satisfactory cleaning of the oven soil within a shorter time span. For this reason this closed door broiling oven has been illustrated in the drawings as being built into a self-cleaning oven, as is evident from the fact that there is a third metal sheated resistance heating element or mullion heater 65 shown in FIG. 1 as encompassing the front of the oven liner. The inner portion of the oven door 12 is telescopically arranged within the mullion heater 65 so that the inner surface of the oven door is heated so as to obtain generally uniform temperatures of the walls of the oven cavity during the high temperature pyrolytic process where the wall temperatures reach a maximum somewhere between about 750° F. and about 950° F.

It will be immediately apparent that during this high temperature heat cleaning operation the motor blower units 45, 46 would not be operating because the cooling action afforded thereby would be working against the heating elements in the oven which are trying to heat up the walls rather than to cool them down as is important during the closed door broiling operation.

Most if not all ovens are provided with a venting or exhaust system such as the oven vent 67 shown in the top wall 15 of the oven liner toward the back thereof. This oven vent is of special design in that it is supplied with a catalytic oxidation unit 68 of the type that is disclosed in the U.S. Pat. No. 2,900,483 to Stanley B. Welch, which is also assigned to the assignee of the present invention. Housed within this unit is a coiled resistance heating element 70 and a plurality of rings or layers of wire screen 71 that are coated with a catalytic material such as platinum which is especially adapted to promote the oxidation of carbon and carbon compounds so as to eliminate smoke, carbon monoxide and other objectionable gaseous products exhausting from the oven cavity. The gentle sweep of room air passing under the bottom edge of the door mixes with the oven gases before entering the oxidation unit 68 and into an exhaust duct 73 having a circuitous path, but which ultimately discharge beneath one of the surface heating units 25 in the cooktop 24. The broil reflector pan 33 would be cut back in the area adjacent the opening to the oven vent 67 so as not to restrict the flow of gases to the vent as might otherwise be concluded from the two dimensional showing in FIG. 1.

Another benefit is derived from combining the present closed door broiling oven system with a self-cleaning oven system so that both systems could share the use of the oxidation unit 68. For instance, during the broiling operation some small amount of smoke, odors and grease would be generated and these could be degraded by the oxidation unit so that the broiling oven would not have to be vented to the outside of the kitchen but may filter or clean the air so that the air may be returned to the kitchen. The same condition prevails during the self-cleaning pyrolytic process.

Modifications of this invention will occur to those skilled in this art, therefore, it is to be understood that this invention is not limited to the particular embodiments disclosed but that it is intended to cover all modifications which are within the true spirit and scope of this invention as claimed.

What I claim as new and desire to secure by Letters Patent of the United States is:

1. The method of broiling food within a closed oven cavity defined by a box-like metal oven liner and an access door; said method comprising the steps of providing a continuous source of radiant heat in the oven cavity, passing relatively cool air over the exterior of the oven liner so as to extract heat from the oven liner and restrict the average liner wall temperatures to a maximum between about 300° F. and about 500° F., while holding the average maximum temperature of the food being broiled to between about 120° F. and about 190 F., allowing a gentle sweep of ambient air of enter the oven cavity, exhausting any gaseous and vapor products which are given off by the food during the broiling operation through an oxidation treatment so as to degrade said products and eliminate obnoxious smoke and odors.

2. The method of claim 1 wherein the food is meat.

References Cited

UNITED STATES PATENTS

| 3,027,444 | 3/1962 | Weeks | 126—21 X |
| 3,310,046 | 3/1967 | Scott et al. | 126—21 |
| 3,348,023 | 10/1967 | Lewis et al. | 126—21 X |

WYMAN LORD, Primary Examiner

U.S. Cl. X.R.

99—1